(12) United States Patent
Rapowitz et al.

(10) Patent No.: US 12,417,315 B2
(45) Date of Patent: Sep. 16, 2025

(54) SCRAMBLING AN IDENTITY ON THE INTERNET

(71) Applicant: Capital One Services, LLC, McLean, VA (US)

(72) Inventors: Samuel Rapowitz, Roswell, GA (US); Bryant Yee, Silver Spring, MD (US); Armando Martinez Stone, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 227 days.

(21) Appl. No.: 18/197,443

(22) Filed: May 15, 2023

(65) Prior Publication Data

US 2024/0386138 A1    Nov. 21, 2024

(51) Int. Cl.
*G06F 21/62* (2013.01)
*G06N 20/00* (2019.01)

(52) U.S. Cl.
CPC ......... *G06F 21/6254* (2013.01); *G06N 20/00* (2019.01)

(58) Field of Classification Search
CPC . G06F 21/6254; G06F 21/6245; G06N 20/00; H04L 67/02; H04L 63/0421
See application file for complete search history.

(56) References Cited

U.S. PATENT DOCUMENTS

| | | | |
|---|---|---|---|
| 10,341,858 B1 | 7/2019 | Pawar et al. | |
| 10,379,995 B1 | 8/2019 | Walters et al. | |
| 10,510,082 B1* | 12/2019 | Zimmerman | G06Q 20/108 |
| 11,615,399 B1* | 3/2023 | Smith | G06Q 20/38215 |
| | | | 705/65 |
| 11,755,848 B1* | 9/2023 | Dan | G06N 20/00 |
| | | | 704/270.1 |
| 11,803,661 B1* | 10/2023 | Sutherland | G06F 40/169 |
| 2003/0154138 A1* | 8/2003 | Phillips | G06F 21/31 |
| | | | 705/26.1 |
| 2003/0177102 A1* | 9/2003 | Robinson | G06Q 20/401 |
| | | | 705/75 |
| 2004/0059953 A1* | 3/2004 | Purnell | G06F 21/34 |
| | | | 726/6 |

(Continued)

OTHER PUBLICATIONS

Sep. 27, 2024—(EP) European Search Report—App No. 24175280.

*Primary Examiner* — Javier O Guzman
(74) *Attorney, Agent, or Firm* — Banner & Witcoff, Ltd.

(57) ABSTRACT

Aspects described herein may obfuscate publicly available personal information by publishing generated synthetic user personal data to one or more sites. By publishing the generated synthetic personal data to one or more sites, a user's actual personal data will be more difficult to discern and/or detect, resulting in greater privacy, security, and/or control of personal information. A machine learning model may be trained to generate synthetic personal data based on verified personal data and/or training datasets. Upon receiving a request from a user, the machine learning model may generate synthetic personal data, which appears similar to the publicly available information but includes false and/or inaccurate data and/or information about the user. The generated synthetic personal data and/or information may be disseminated to a plurality of sites to hide, or otherwise obfuscate, the user's actual data and/or information.

20 Claims, 6 Drawing Sheets

(56) References Cited

U.S. PATENT DOCUMENTS

| | | | |
|---|---|---|---|
| 2014/0208418 A1* | 7/2014 | Libin | G06F 21/6209 |
| | | | 726/19 |
| 2018/0276393 A1* | 9/2018 | Allen | G06F 21/602 |
| 2019/0034657 A1* | 1/2019 | Ford | G06F 21/577 |
| 2020/0097676 A1* | 3/2020 | Margel | G06F 21/316 |
| 2020/0213329 A1* | 7/2020 | Simons | G06F 21/33 |
| 2021/0056405 A1* | 2/2021 | Bradshaw | G06N 20/00 |
| 2021/0133337 A1 | 5/2021 | Adams et al. | |
| 2021/0182429 A1* | 6/2021 | Chen | H04L 51/10 |
| 2021/0232706 A1* | 7/2021 | Peruski | G06N 20/00 |
| 2022/0179990 A1* | 6/2022 | Tran | G06N 3/08 |
| 2022/0182412 A1* | 6/2022 | Borak | H04L 63/1491 |
| 2022/0255943 A1 | 8/2022 | Kulai et al. | |

* cited by examiner

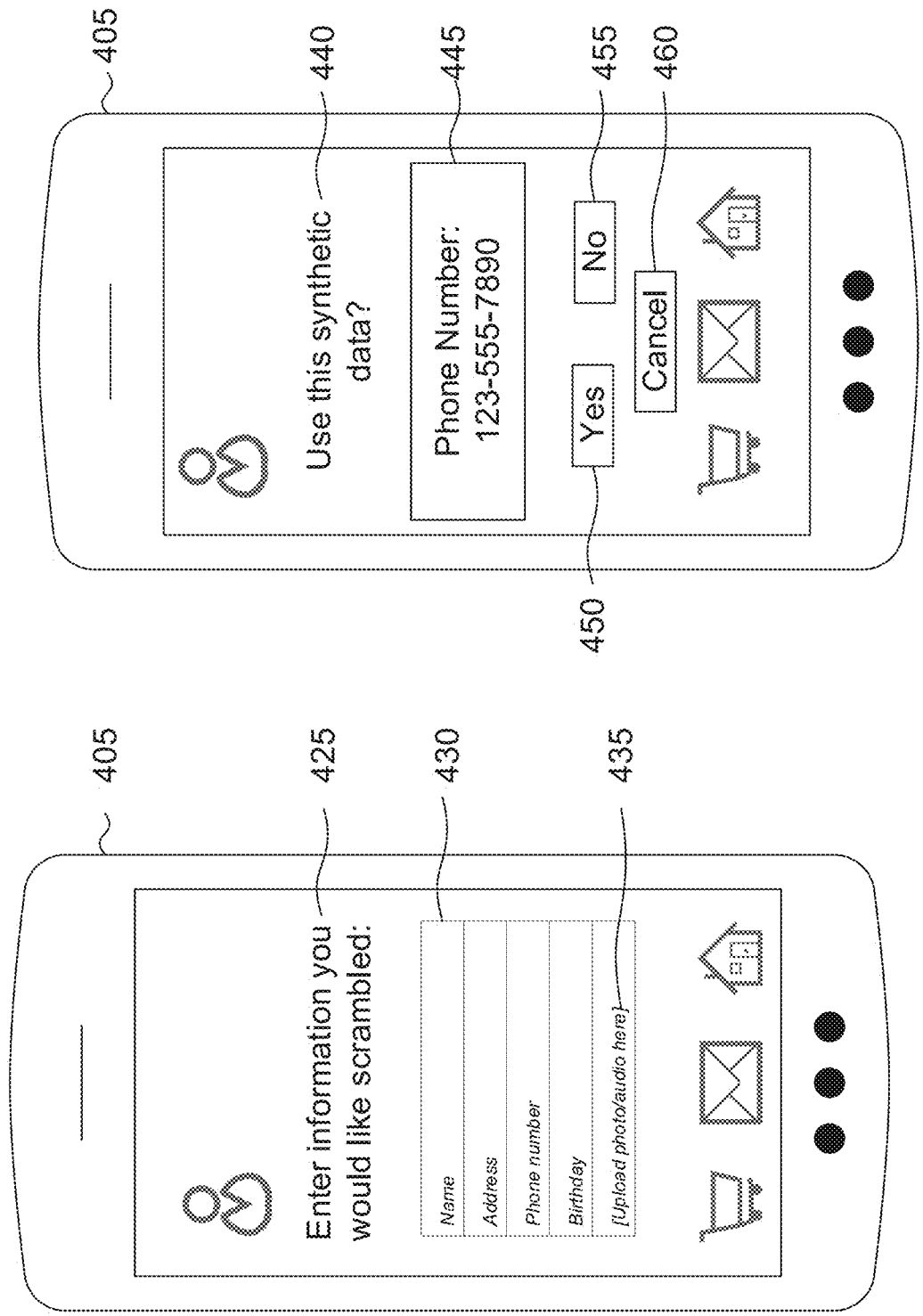

SCRAMBLING AN IDENTITY ON THE INTERNET

Aspects of the disclosure relate generally to protecting a user's privacy on the Internet. More specifically, aspects of the disclosure may obfuscate personal information by generating synthetic information and publishing the generated synthetic information to a public site.

BACKGROUND OF THE INVENTION

Due to the increasing popularity of social media platforms and other online communities requiring a public presence, there is an escalating concern that a user's personal information may be unknowingly or unwillingly accessible to the public. Completely retracting personal data from public scrutiny is a herculean task, as the publicly available personal data may not be completely under the control of the user. For example, a friend or family member may post an embarrassing photo of the user online, or the undesired published data may be government information already in the public domain. Further, aggregators may collect and publicize personal data without consent. Although at first personal data may be innocently published, over time a user may prefer greater privacy for work and/or personal reasons. Therefore, there is a need to monitor and/or scramble an individual's or entity's publicly accessible personal data.

SUMMARY OF THE INVENTION

Aspects described herein may address these and other problems, and generally improve a user's privacy and security by monitoring an individual's or entity's publicly available personal data then implementing measures to either remove or obfuscate the information. In obfuscating personal information, the method may generate and publish synthetic personal data, inundating the public area with the generated synthetic personal data, such that the user's real personal data becomes harder to discern, locate, and/or authenticate. Such measures may employ a trained machine learning model to generate synthetic personal data, then publish the synthetic personal data to one or more public sites.

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may protect a user's privacy by generating and disseminating synthetic personal data to public sites, like the Internet and/or data aggregators. The generated synthetic personal data may obfuscate a user's published personal data, thereby insulating the user's personal information from public scrutiny. According to some aspects, a machine learning model may be trained to generate synthetic personal data to achieve these and other benefits, such as allowing users to better manage their reputations, decreasing anxiety associated with online interactions, helping to maintain healthy social boundaries, and the like. Training data used to train the machine learning model may be obtained from a variety of sources. For example, the training data may be obtained by using a scraping algorithm to obtain examples of personal information, such as names, addresses, photos, etc. Additionally or alternatively, the training data may be obtained by retrieving verified personal data associated with the user. In some examples, the training data may comprise data from a plurality of sources. After obtaining the training data, the training data may then be used to train the machine learning model to generate synthetic personal data similar to, but different from, a user's true personal data. Synthetic personal data generated based on the user's personal data may provide more realistic results, which may be disseminated to increase an individual's or an entity's online privacy, personal security, and/or control over their information.

After the machine learning model has been trained, the machine learning model may be deployed as service (e.g., a Software-as-a-Service (SaaS)) offered through, for example, a mobile application, a website, a web portal, etc. The service may receive a request from a user to obfuscate the user's identity on the Internet. Upon receiving the request to obfuscate the user's identity, the service may search, crawl, and/or scour the Internet, public sites, data aggregators, social media platforms, etc. for the user's personal data. Additionally or alternatively, the service may monitor the Internet, public sites, data aggregators, social media platforms, etc. for the user's personal data. Based on the user's personal data and based on the request to obfuscate the user's identity on the internet, the service, using the trained machine learning model, may generate synthetic personal data. The generated synthetic personal data may then be disseminated to the Internet, public sites, data aggregators, social media platforms, etc. By disseminating the generated synthetic personal data, the service may obfuscate the user's personal data by creating uncertainty about which data and/or information found on the Internet is accurate. This may reduce and/or avoid unwanted phone calls and/or emails (e.g., SPAM), as well as unsolicited mailings.

As noted above, the present disclosure describes a computer-implemented method for obfuscating a user's personal information. For example, a computing device may receive a request to obfuscate a user's identity on the Internet, public sites, data aggregators, social media platforms, etc. After receiving the request, the computing device may determine one or more locations that store and/or publish information associated with the user. The computing device may then monitor the one or more locations, as well as perform periodic searches to determine additional locations that store and/or publish information associated with the user. Once information associated with the user is located, the computing device may use the trained machine learning model to generate synthetic personal data associated with the user. The synthetic personal data may appear similar to the user's verified personal data, while being different. The computing device may disseminate the synthetic personal data to the Internet, public sites, data aggregators, social media platforms, etc., for example, based on where the user's personal data was located.

In some examples, the computing device may calculate a difference value between the synthetic personal data and the verified personal data prior to disseminating the synthetic personal data. In this regard, disseminating the synthetic personal data to the Internet, public sites, data aggregators, social media platforms, etc. may be based on a determination that the difference value satisfies a threshold. For example, the computing device may calculate a difference value between the generated synthetic personal data and ground truth data indicating that the generated synthetic personal data is credible as realistic data to a viewer. Additionally or alternatively, the computing device may calculate a similarity value between the generated synthetic personal data and the user's true personal data. The similarity value may indicate how closely the generated synthetic personal data is alike to the user's true personal data. The computing device may disseminate the synthetic personal data to one or more public sites based on a determination that the similarity value satisfies a second threshold.

In some instances, disseminating the synthetic personal data may include creating and/or publishing dummy websites and/or social media accounts. Once the synthetic personal data is generated, the synthetic personal data may be uploaded to the dummy websites and/or social media accounts. Additionally or alternatively, the computing device may remove one or more entries from a user's website (e.g., blogpost) and/or social media account and replace the one or more removed entries with the generated synthetic personal data. Additionally or alternatively, the generated synthetic personal data may be disseminated to a Tor, or dark web, network. Further, the generated synthetic personal data may be disseminated to the Internet. In further examples, disseminating the generated synthetic personal data may comprise posting the generated synthetic personal data to a social media website, publishing an article containing the synthetic personal data to a news website, publishing a blog post that comprises the synthetic personal data, and the like.

These features, along with many others, are discussed in greater detail below. Corresponding apparatus, systems, and computer-readable media are also within the scope of the disclosure.

BRIEF DESCRIPTION OF DRAWINGS

The present disclosure is illustrated by way of example and not limited in the accompanying figures in which like reference numerals indicate similar elements and in which:

FIGS. 4A-4D depict exemplary graphical user interfaces (GUI) according to one or more aspects of the disclosure.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for obfuscating a user's publicly available personal data by generating synthetic personal data and disseminating the synthetic personal data to the Internet, public sites, data aggregators, social media platforms, etc. As discussed further herein, this combination of features may allow for obfuscating an individual's or an entity's online privacy and/or personal security.

Figure 1:
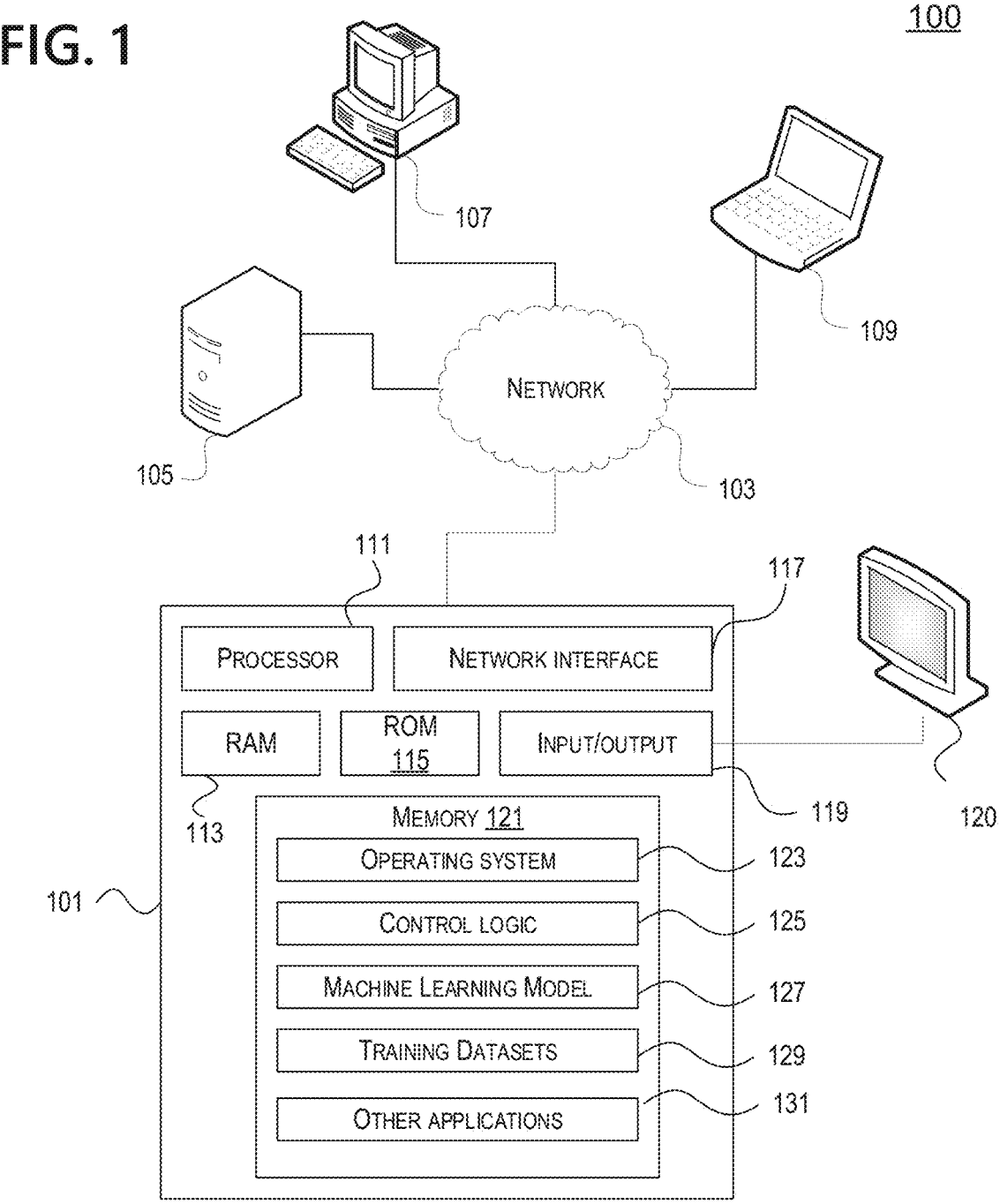
FIG. 1 depicts an example of a system that may be used in implementing one or more aspects of the disclosure.

FIG. 1 illustrates one example of an operating environment 100 comprising a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display, such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning model 127, training datasets 129, and/or other applications 131. Control logic 125 may be incorporated in and may be a part of machine learning model 127. As will be discussed in greater detail below, machine learning model 127 may include one or more of a generative adversarial network (GAN) model, a convolutional neural network (CNN) model, a recurrent neural network (RNN) model, a random forest model, an autoencoder model, a variational autoencoder model, a synthetic data model, deep learning architectures, any artificial neural network, or the like. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or machine learning model 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, Perl, or any equivalent thereof. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

A company may offer a service that allows users to obfuscate their identity on the internet. The company may train a machine learning model to generate synthetic personal data, then publish the generated synthetic personal data to one or more locations, effectively hiding user personal data amongst a profusion of synthetic user data. The machine learning model may comprise one or more machine learning models such as a generative adversarial network (GAN) model, a convolutional neural network (CNN) model, a recurrent neural network (RNN) model, multi-layer perceptions (MLP), a random forest model, a gaussian mixture model (GMM), an autoencoder model, a variational autoencoder model (VAE), a k-nearest neighbors model (kNN), a k-means model, a synthetic data model, a support vector machine model (SVM), deep learning architectures, any artificial neural network, or the like. The GAN model may include conditional GANs (cGAN), deep convolutional GAN (DCGAN), self-attention GAN (SAGAN), Flow-GAN, variational autoencoder GAN (VAEGAN), transformer GAN (TransGAN), or the like. Further, the machine learning model may comprise one or more of gradient descent algorithms, such as a stochastic gradient descent, differentiable generator networks, Bayesian network models, support vector machines (SVMs), logistic regression analysis, decision trees, relevance vector machine (RVM), backpropagation methods, feed-forward methods, or the like. Regression, classification, clustering and/or decision-making algorithms may be included in the one or more machine learning models. Additionally, the machine learning model may include one or more classification models, which may be based on a neural network algorithm, a hierarchical attention network algorithm (HAN), support vector machines (SVMs), Bayes classifiers, binary classifiers, or the like. The machine learning models may be trained by supervised learning, unsupervised learning, semi-supervised learning, or reinforcement learning structures.

A computing device may use one or more training datasets 129 to train the machine learning model 127 to generate realistic synthetic data. The computing device may also train the machine learning model to predict whether the generated synthetic data would be considered real or authentic to observers. The one or more training datasets 129 may comprise one or more ground-truth datasets including datasets comprising user data, previously generated datasets, consumer produced datasets, and/or the like. The user data may be user verified data or user data discovered already publicly published through the use of web crawlers, aggregators, or the like. Further, information for the datasets may be acquired through commercial establishments, public government databases, and/or crowdsourcing platforms. The one or more training datasets 129 may be structured, unstructured, and/or semi-structured data. The one or more training datasets 129 may be tagged to identify particular characteristics, associations, correlations, transactions, locations, and/or the like. Tagging refers to labeling and/or annotating data appropriate for the particular purpose, including machine learning datasets, classifying and organizing data, and/or the like. Tagging may include identifying one or more particular attributes and/or features of each instance of data. Additionally or alternatively, tagging may identify one or more particular attributes and/or features shared by all the instances of data in the set (e.g., identifying the metadata).

The one or more training datasets 129 may be produced by machine learning models, by persons, through aggregators, and/or the like. Further, the one or more training datasets 129 may be acquired from commercial establishments, public government databases, or crowdsourcing platforms. Additionally, the computing device may employ other types of datasets, such as validation datasets and test datasets, to fully train the machine learning model. Further, results generated from implementing a trained machine learning model may be used to either re-train or further train the machine learning model.

Figure 2:
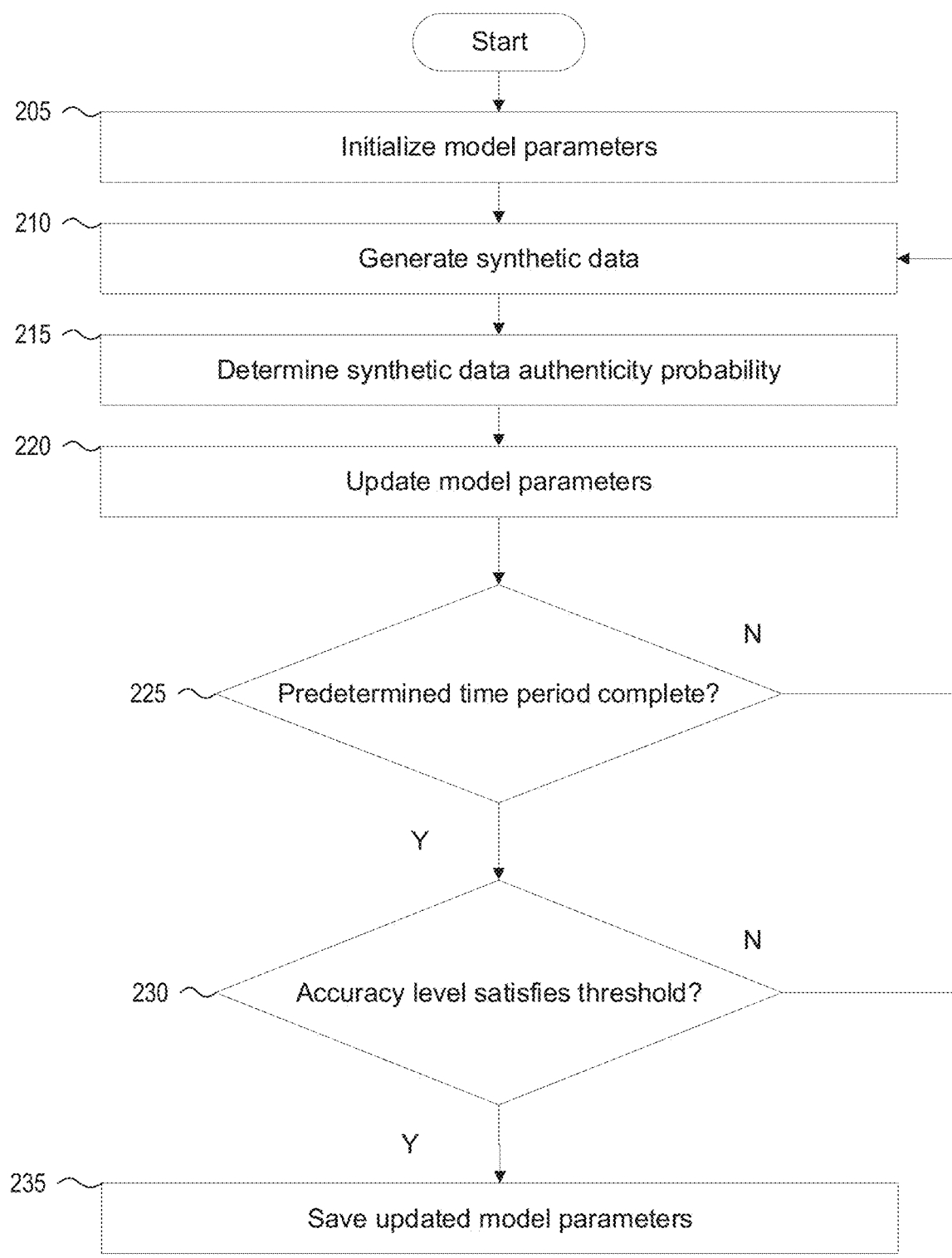
FIG. 2 depicts an exemplary flow chart for a method of training a machine learning model according to one or more aspects of the disclosure.

FIG. 2 shows an example of training a machine learning model in accordance with one or more aspects of the disclosure. As noted above, the machine learning model may comprise a generator and a discriminator. The generator and/or the discriminator may each comprise one or more machine learning models, such as neural networks or deep learning structures, algorithms, artificial intelligence, and/or the like. According to the present disclosure, one or more parameters of the machine learning model may be optimized such that when in use, the machine learning model produces synthetic data that an observer would recognize as authentic. The discriminator and generator may be trained concurrently or separately.

In step 205, the computing device may initialize the generator and/or discriminator with a random set of initial model parameters. Alternatively, the generator and/or discriminator may be initialized with a white noise set of initial model parameters. Further, the set of initial model parameters may be set to zero for the generator and/or discriminator. Alternatively, the set of initial model parameters may be initialized with a recommended initialization set (i.e., Kaiming He, Xavier, or the like).

In step 210, the computing device may train the generator to generate synthetic data. The generator may be trained using training datasets, such as the one or more training datasets 129. The training datasets may be obtained using a scraping algorithm to obtain examples of personal information, such as names, addresses, photos, etc., from the Internet, social media sites, etc. Additionally or alternatively, the training datasets may be obtained by retrieving verified personal data associated with the user. In some examples, the training data may comprise data from a plurality of sources, including, for example, the Internet, social media sites, verified personal data, etc. The synthetic data may be similar to the user's actual, verified data, but differ from the actual, verified data. For example, a synthetic name may comprise an alternative spelling of the user's name. Additionally or alternatively, a synthetic name may comprise a misspelling of the user's name or a name that sounds similar to the user's name. A phone number may be different from the user's actual phone number by one or more digits. In this way, the generator may be trained to generate synthetic data that resembles, or is similar to, the user's address, e-mail, likeness, social media handle, social media username, credit card number, social security number, date of birth, etc. The synthetic data may be text, an image, video, or any combination thereof. After generating the synthetic data, the generator may send the synthetic data to the discriminator.

In step 215, the computing device may train the discriminator to evaluate the generated synthetic data. Evaluating the generated synthetic data may comprise determining a probability of authenticity. Authenticity predictions indicate whether viewers would identify the generated synthetic data as real data or fake data. For example, the discriminator may calculate a probability that the generated synthetic data appears to be, or similar to, real (e.g., authentic) data. If the probability satisfies a threshold, the discriminator may classify the generated synthetic data as authentic. If the probability fails to satisfy the threshold, the discriminator may classify the generated synthetic data as fake data. The discriminator may classify the generated synthetic data with a one ("1") or a zero ("0"). One ("1"), or close to one, may indicate that the generated synthetic data appears to be real (e.g., authentic) data. Zero ("0"), or close to zero, may indicate that the generated synthetic data appears fake. In some examples, the threshold may be a number between zero and one. For example, the threshold value may be set to 0.7. Generated synthetic data with a probability greater than or equal to 0.7 may be determined as appearing similar to real (e.g., authentic) data. Generated synthetic data with a probability less than 0.7 may be determined as appearing as fake data. The computing device may determine if the discriminator correctly evaluated the generated synthetic data.

At step 220, the computing device may update, or modify, one or more model parameters of the discriminator and/or generator to produce more accurate results, for example, based on the discriminator's prediction and classification of the generated synthetic data. For example, when the discriminator correctly predicts instances of fake data, the generator's model parameters may be modified to produce more credible and/or realistic synthetic data. Further, when the discriminator incorrectly predicts instances of fake data, the discriminator's model parameters may be modified to improve and/or maximize predictions of authenticity.

At step 225, the computing device may determine if a predetermined time period for training the machine learning model is completed. The predetermined time period may be based on a number of batches, iterations, and/or epochs of the one or more training datasets. Alternatively, the predetermined time period may be a specific timeframe for training the machine learning models. If the predetermined time period has not been reached, the training process may return to step 210, where additional synthetic data may be generated based on the one or more training datasets.

At step 230, after the predetermined time period has elapsed, the computing device may determine whether the machine learning model generated synthetic data satisfies an accuracy threshold. The accuracy threshold may be predetermined. Alternatively, the accuracy threshold may be satisfied when the machine learning model converges. If the machine learning model fails to satisfy the accuracy level threshold, the process returns to step 210, where training continues and further datasets may be required. Additionally or alternatively, further batches, iterations, and/or epochs may need to be run or rerun through the machine learning model.

At step 235, when the accuracy level threshold is satisfied, the computing device may determine that the machine learning model is trained and save model parameters. The machine learning model may be deployed and used to generate user synthetic personal data. During deployment, the machine learning model may be retrained periodically, starting at step 220, to update the machine model parameters based on the results from the generated user synthetic personal data, as described below.

Figure 3:
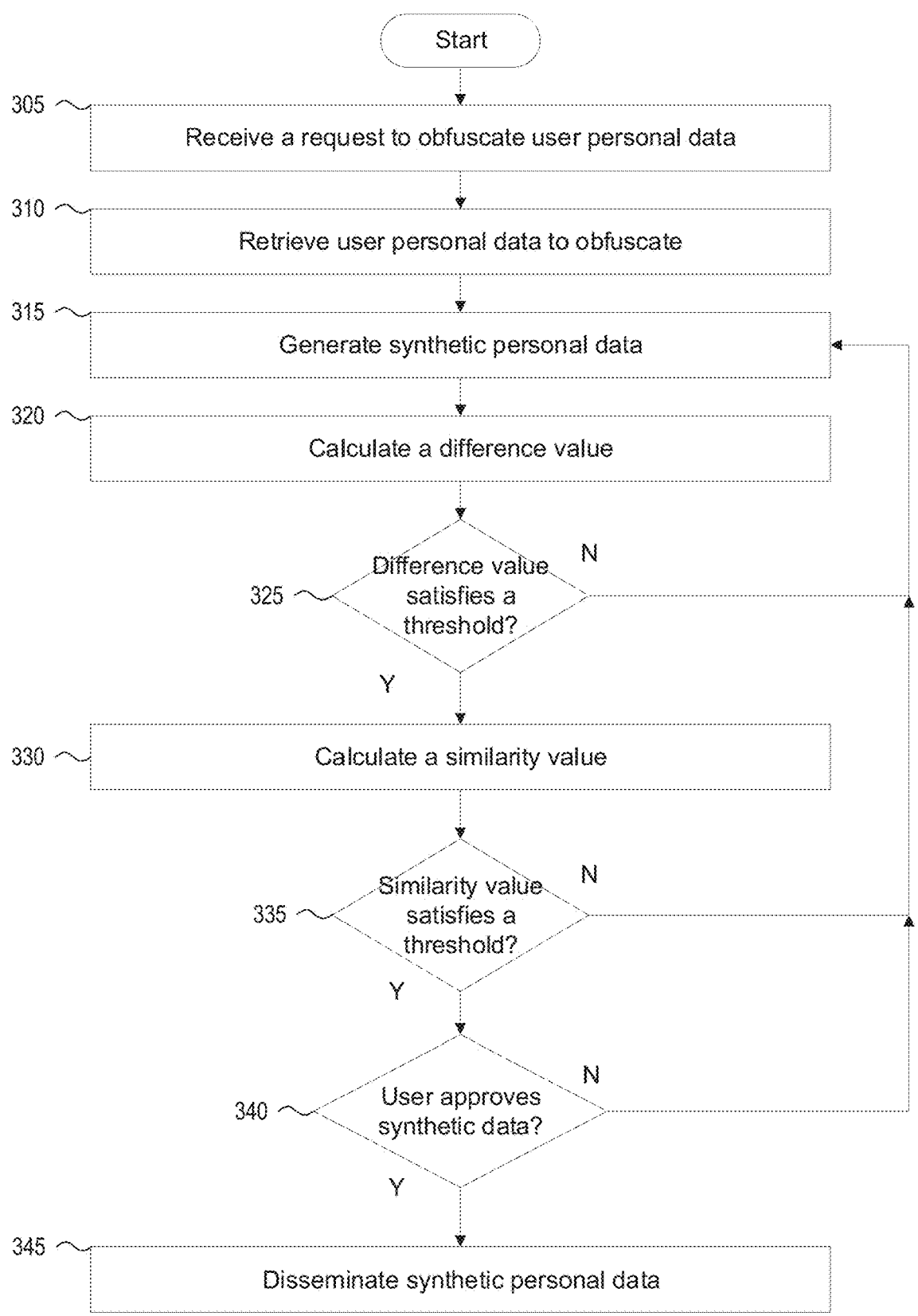
FIG. 3 depicts an exemplary flow chart for a method of obfuscating a user's publicly available personal data according to one or more aspects of the disclosure.

Once the machine learning model is trained, the machine learning model may be deployed, for example, in a mobile application located on a user's mobile device, as a desktop application, or as a service (e.g., SaaS) through a web portal. In this regard, the machine learning model may be offered as a product or service that allows users to request that their identity be obfuscated. FIG. 3 shows an example of generating and disseminating synthetic personal data to obfuscate true user personal data. Method 300 may be implemented by any suitable computing device described herein, including, for example, computing devices 101, 105, 107, and 109.

At step 305, the computing device may receive a request to obfuscate or scramble publicly available user personal data. For example, the request may be received from a mobile device, a desktop application, a cloud computing infrastructure, a web portal, or the like. The mobile device may be a cell phone, smart phone, tablet, or other personal device. In some examples, the request to obfuscate publicly available user personal data may be in response to a query from the computing device. For example, the computing device may send (e.g., transmit) an electronic communication (e.g., push notification, text message, email, etc.) to a user device with an offer to obscure the user's identity and/or personal information on the Internet. The user may accept the offer, which may include sending a response to the computing device that indicates that the user wishes to obfuscate their identity and/or personal data and/or information. In some instances, the request to obfuscate the user's identity and/or personal data and/or information may comprise an indication of the data and/or information the user wishes to obfuscate. For example, information that the user wishes to obfuscate may comprise their name, phone number, address, e-mail address, username, social media handle, bank account number, credit card number, social security number, date of birth, or any other equivalent personally identifiable information. Additionally or alternatively, the information that the user wishes to obfuscate may include specific dates, images, videos, audio files, events, or the like.

At step 310, the computing device may acquire user personal data to obfuscate. The user may provide the specific personal data to obfuscate through the mobile device, desktop application, cloud computing infrastructure, web portal, or the like. Further, the computing device may retrieve user personal data from a database associated with the computing device, a third-party, previously published personal data, and/or the like. The retrieved user personal data may be compared to the provided personal data to determine the accuracy of the personal data provided by the user. The database associated with the computing device may include previously verified personal data obtained during an account set-up, for example, as part of a "know your customer" program. The third-parties may include government or private entities. Government entities may include federal, state, or local agencies, such as those that provide background investigations or public records, like the Internal Revenue service (IRS), Federal Bureau of Investigation (FBI), Office of Personnel Management (OPM), Homeland Security, or the like. Private entities may comprise credit bureaus, background check organizations, employment businesses, or the like. Further, the computing device may search, crawl, and/or scour the Internet, public sites, data aggregators, social media platforms, etc. to locate the user's personal data. Additionally or alternatively, the computing device may monitor the Internet, public sites, data aggregators, social media platforms, etc. for the user's personal data. The computing device may use a search engine, programmed search alerts, artificial intelligence, neural networks, machine learning models, web crawlers, web scrapers, or the like. The computing device may use a database of known sites to search. For example, the computing device may access a database of known dark web addresses to detect user personal data on the dark web.

The computing device may tag the located user personal data and/or public sites for indexing, machine learning training, database management, and/or the like. As used herein, the term "tag" or "tagging" refers to data labeling of identified characteristics, associations, correlations, transactions, locations, and/or the like in a manner appropriate for the particular purpose, including machine learning datasets (e.g., training datasets, validation datasets, testing datasets, or the like), classifying and organizing data, and/or the like. The tag may identify the meta data, specific data, as well as the type of personal data, such as "birth date" or "last name." Further, the tag may indicate the type, name, and/or address of the public site on which the user personal data was found. The types of public sites may comprise a social media website, a news website, a blog post, an intranet site, a social media account and/or a software application. Further, the public sites may be located on the internet, the dark web, a Tor network, or an intranet site.

The personal data provided by the user may be compared to the data the computing device acquired from third-parties, public sites, and/or databases associated with the computing device. In this way, the computing device may verify the user provided personal data by comparing the data the user provided with the personal data retrieved by the computing device. If the personal data provided by the user does not match the personal data obtained by the computing device, the computing device may alert the user. Additionally or alternatively, the computing device may send an electronic communication to the user, requesting that the user remediate the discrepancy. In some examples, the user may select from one or more options. For example, if the user provided an address of 1234 Main Street, and the address located in the database associated with the computing device listed user's address of 2222 Main Street, the computing device may present the conflicting address to the user with an option to choose the correct address. Additionally or alternatively, the computing device may present the inconstant personal data to the user to allow the user to choose specific data for the computing device to obfuscate.

At step 315, the computing device may generate synthetic personal data, for example, if the personal data provided by the user matches the personal data the computing device obtained from other sources (e.g., the database, government entities, etc.), or if the user verifies the personal data. The synthetic personal data may be generated using a machine learning model trained according to the techniques described above with respect to FIG. 2 and/or the verified user personal data. The machine learning model may comprise any one or more of the machine learning models described above with respect to FIG. 1.

Generating synthetic personal data may result in data of a similar format to the user personal data. For example, if the user wishes to obfuscate a phone number, the generated synthetic personal data may be generated in the form of one or more phone number formats. The generated synthetic phone number may contain an area code and/or a country code. The digits of the generated synthetic phone number may be separated by dashes (i.e., "123-456-7891"), periods (i.e., "123.456.7891"), spaces (i.e., "123 456 7891"), a combination of any of the above, and/or include parentheses indicating an area code (i.e., (123) 456-7891").

Further, the format of the generated synthetic personal data may be different than the user's real personal data. For example, the user's real personal phone number may be a United States (US) phone number. The generated synthetic personal data may then be constructed in the form of a US number, with the standard format of a three-digit area code and seven-digit phone number. Alternatively, the generated synthetic personal data may take the form of a different country's phone number format. For example, the generated synthetic phone number may be created in the French phone number format, that is, a 10-digit long number written in groups of two separated by spaces or periods (i.e., "01 23 45 67 89").

As a further example, the user may desire to obfuscate their image on public sites to increase personal privacy. The computing device may generate one or more synthetic images that illustrates a person of similar features to that of the user, but the person in the synthetic image is clearly different than the user. For example, the synthetic image may display the same race or gender as the user, however, the synthetic image may exhibit different facial features than the user. User facial features may be adjusted in the generated synthetic image by removing true image facial features, changing their size or locations, or adding facial features. For example, if the user has a distinct facial feature, such as a prominent chin, conspicuous moles, or high cheekbones, the synthetic image generator may change the shape and/or size of the chin, remove and/or relocate the moles, and/or lower the cheekbones. Further, the synthetic image may exhibit facial features not belonging to the user's true image. For example, the synthetic image may display different facial feature measurements, a different facial type, or add dimples, tattoos, and/or freckles.

Additionally or alternatively, the computing device may generate one or more synthetic images that contain features very different and/or opposite to the user. For example, the synthetic image may display a figure exhibiting a different age, race, ancestry, gender, body shape, and/or the like than the user's true image. For example, the user may be a twenty-year-old Asian female desiring greater online privacy. She may request her synthetic personal data include differences in age, gender, and/or race, such that when the synthetic personal data is promulgated online, her true image will be more difficult to discern and/or detect, thereby affording her greater online privacy and security.

In step 320, the computing device may calculate a difference value between the generated synthetic personal data and ground truth data. The ground truth data may include one or more of the user's actual data, verification datasets, test datasets, training datasets, datasets configured with information from public sources, and/or the like. The difference value may be used to determine whether the generated synthetic personal data is recognizable as real data instead of generated data. Further, the difference value may be calculated using one or more machine learning models, neural networks, deep learning algorithms, artificial intelligence, statistical algorithms, and/or the like. Further, the calculation may employ one or more of: image correlation or distortion analysis; image tracking; deformation mapping; classification, regression, or clustering analysis; spectrograms; and/or the like to determine the difference value between the synthetic personal data and the ground truth data. Further, the calculation may use one or more Root Mean Square Error (RMSE), Peak Signal-to-Noise Ratio (PSNR), Structural Similar Index Measure (SSIM), Feature Similarity Indexing Method (FSIM), Information Theoretic-based Statistic Similarity Measure (ISSM), Signal to Reconstruction Error Ratio (SRE), and/or Universal Image Quality Index (UIQ) analyses. Additionally or alternatively, the calculation may utilize computer vision, natural language processing (NLP), automatic speech recognition (ASR), digital signal processing, spectral analysis and/or similar techniques. The difference value may be a probability percentage, predicting anticipated authenticity by others. Alternatively, the difference value may be between zero and one. As noted above, one, or greater than or equal to a threshold value, may indicate that the generated synthetic data may pass off as real data when viewed by others, whereas a zero, or a value below the threshold value may indicate that third parties would recognize the generated synthetic personal data as being fake.

If the generated synthetic personal data is an image, the computing device may compare the generated synthetic image to real images to determine whether the synthetic image presents discrepancies that would signal to a viewer that the image was fake. These discrepancies may include one or more asymmetric or unbalanced facial features, surreal backgrounds, unnatural color bleeds, unusually stretched or prominent facial characteristics, randomly placed facial features, or the like. The computing device may calculate a difference value between the generated image and the real images.

As a further example, if the user requested an audio file to obfuscate, the computing device may compare the generated synthetic audio file to real audio files to determine a difference value. To calculate the difference value, the computing device may analyze the dialog or what is being said on the generated synthetic audio file to determine if a person would be likely to say such dialog. Further, the computing device may analyze the cadence, inflection, and/or accent of the audio file to determine human voice authenticity. Additionally or alternatively, the computing device may consider the quality of voice in the audio file and/or the quality of the background to determine whether a hearer would question the authenticity of the audio file.

At step 325, the computing device may determine if the difference value satisfies a first threshold. The first threshold may be predetermined. Additionally or alternatively, the first threshold may be calculated by one or more machine learning models—such as those described above, neural networks, deep learning algorithms, artificial intelligence, statistical algorithms, and/or the like. The first threshold may also be calculated utilizing user input. If the difference value fails to satisfy the first threshold, indicating that the generated synthetic personal data would fail to pass as authentic data when consumed by others, the computing device may return to step 315, to generate further synthetic personal data, and continue the process.

At step 330, the computing device may calculate a similarity value between the generated synthetic personal data and the user's true data, for example, when the difference value satisfies the first threshold. The similarity value may be a numerical value between zero and 100. One hundred (100), or a value greater than or equal to a threshold, may represent that the generated synthetic personal data appears similar, or is equivalent, to the user's true data. Zero (0), or a value below the threshold, may represent a lack of similarity between the generated synthetic personal data and the user's true data. Alternatively, the similarity value may be represented as a percentage. The similarity value may be calculated using any of the techniques and/or processes use to calculate the difference value.

At step 335, the computing device may determine whether the similarity value between the generated synthetic personal data and the user's true data satisfies a second threshold. The second threshold may be predetermined.

Additionally or alternatively, the second threshold may be calculated by one or more machine learning models—such as those described above, neural networks, deep learning algorithms, artificial intelligence, statistical algorithms, and/or the like. The second threshold may also be calculated utilizing user input. For example, the user may indicate that the user would prefer a greater similarity between user's true data and the generated synthetic personal data. If the computing device determines that the similarity value does not satisfy the second threshold, the computing device may return to step 315 to generate further synthetic personal data and begin the process again.

At step 340, if the computing device determines that the similarity value does satisfy the second threshold, the computing device may present the generated synthetic personal data to the user for approval. The computing device may use a GUI to display the synthetic personal data on the user's device. The GUI may present options for the user to approve, disapprove, adjust, or cancel the synthetic personal data. If the user disapproves the generated synthetic personal data, the computing device may revert to step 315 and generate different synthetic personal data. Additionally or alternatively, when the difference value and/or the similarity value do not satisfy their respective thresholds, the model may be retrained using the techniques described above with respect to FIG. 2. Additionally or alternatively, the computing device may modify the first and/or second thresholds according to user feedback, as described above.

If the user approves the generated synthetic personal data at step 340, the computing device may disseminate the generated synthetic personal data at step 345. The generated synthetic personal data may be disseminated by publishing the generated synthetic personal data to the one or more public sites where the user's personal data was discovered and/or one or more public sites where the information was not originally published. The computing device may publish the synthetic by submitting a comment, replying to a post, submitting a post, emailing or communicating with the publisher to request publication, or the like. The public sites may be located on the Internet, e.g., a webpage, a social media account, a news website, a blog post, or the like. Additionally or alternatively, the generated synthetic personal data may be disseminated to a Tor, or dark web, network, or an intranet page. Further, the user may select, via a GUI, which sites to post the synthetic personal data to.

Additionally or alternatively, the computing device may replace a user's publicly available personal data with the generated synthetic personal data on one or more of a user's own social media account. For example, the user may indicate the user's social media accounts during an account setup or during any step of the disclosed method. The user may indicate their personal social media accounts via the GUI on a mobile device, a website application, or the like. Additionally, the user may submit the social medial account's login credentials, including usernames and passwords. The computing device may require the user to sign a permission document, consenting to the computing device's access to and modification of the user's social media account's publications. After gaining authorization, the computing device may remove the publicly available personal data and post the synthetic personal data. The computing device may remove and alternatively replace sections of the social media post (i.e., a sentence, phrase, paragraph, and/or the like). Additionally or alternatively, the computing device may remove and alternatively replace the entire social media post. For example, after determining a user's social media account posted an undesired public photograph of the user, the computing device may use a trained machine learning model to generate a synthetic photo of the user, then replace the undesired public photograph with the synthetic photo.

The computing device may use a trained machine learning model, a statistical algorithm, or the like to determine where to disseminate the synthetic personal data in order to best obfuscate user personal data in public. For example, the computing device may calculate an obfuscation rate for each type of public site, then determine whether the obfuscation rate satisfies an obfuscation threshold. Additionally or alternatively, the computing device may train a machine learning model to generate a model to produce a probability of obfuscation success, for example, using the techniques described above with respect to FIG. 2. The computing device may use training datasets, as described above, as well as user feedback to train the machine learning models.

Further, the computing device may generate dummy public sites to publish user synthetic personal data. The computing device may train a machine learning model to generate synthetic public sites, for example, using the process described in FIG. 2 above. The computing device may use training datasets as described above as well as information relating to the public sites where the user personal data was found to train the machine learning models. The user may approve or reject the generated dummy public sites via a GUI. Further, user feedback may be used to train the machine learning models.

For example, if user personal data was discovered at a user's blog, the computing device may post user synthetic personal data to the user's blog and/or to additional public sites, like webpages, friend's social media accounts, and/or the like. Further in this example, since the user personal data was found on user's own personal website, the computing device may request permission from the user to delete the blog post or part of the blog post where the user personal data was located. Additionally or alternatively, the generated synthetic personal data may be disseminated to a Tor, or dark web, network. Additionally or alternatively, the generated synthetic personal data may be disseminated to an intranet page.

FIGS. 4A-4D provides exemplary GUIs displayed on user device 405. User device 405 may correspond to one or more of devices 101, 107, 109, or 120 of FIG. 1, or one or more different devices. The GUIs depicted in FIGS. 4A-4D may be implemented by suitable program instructions and by any suitable computing environment, for example as disclosed in FIG. 1. Further, the GUIs may be deployed as part of a service (e.g., a Software-as-a-Service (SaaS)) offered through, for example, a mobile application, a website, a web portal, etc.

Figure 4A:
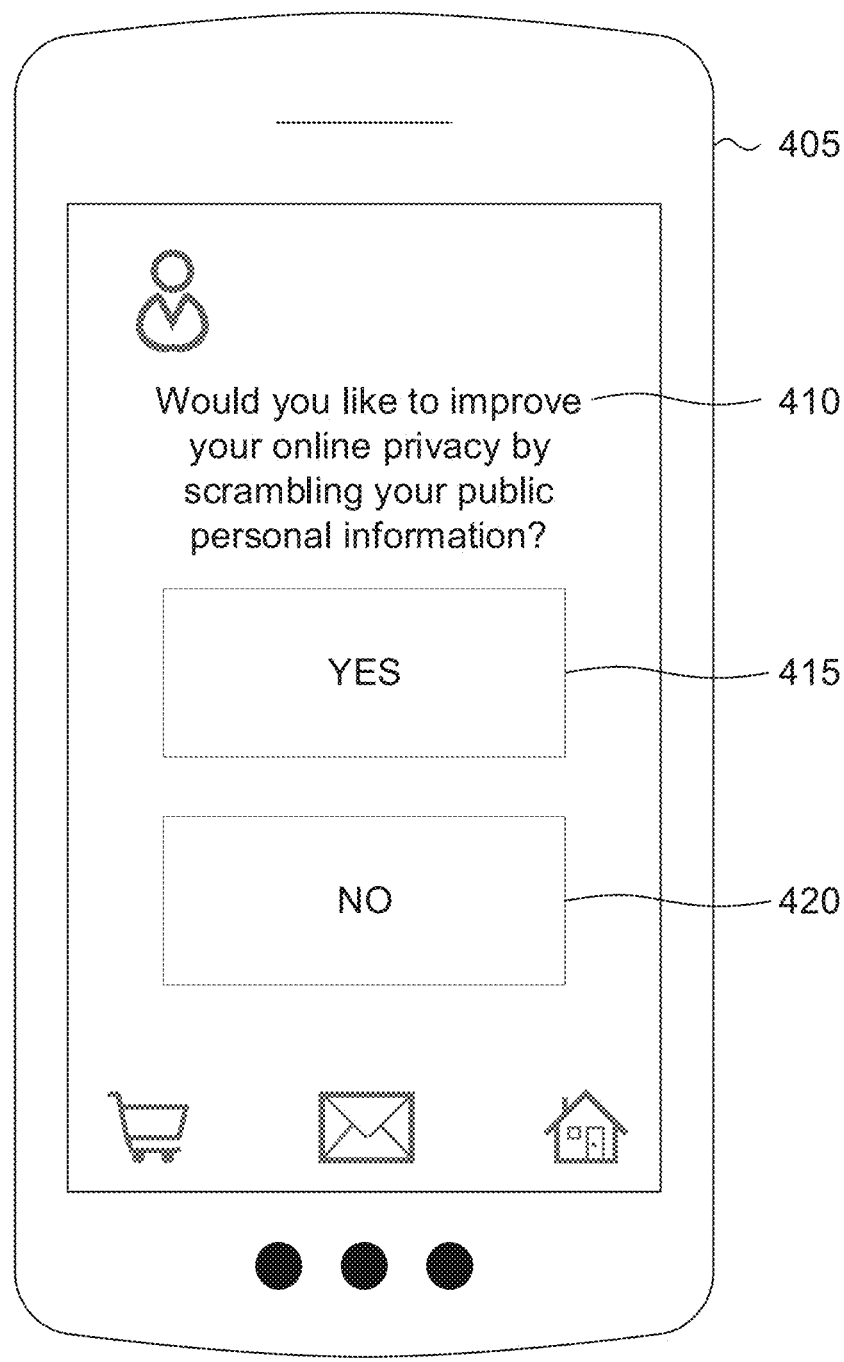

FIG. 4A illustrates user device 405 displaying a first user interface 410. The first user interface 410 may be displayed, for example, in response to the user device 405 receiving, from a computing device (e.g., server), a request (e.g., offer) to obfuscate the user's publicly available personal information. The first user interface 410 may also present two options: Acceptance Option 415 and Rejection Option 420. If the user selects the Acceptance Option at 415, the user device 405 sends a response to the computing device, the response may indicate acceptance of the offer to obfuscate user personal data. If the user selects the Rejection Option at 420, the user device 405 may send a response indicating that the user has refused the offer to obfuscate the user's publicly available personal information.

After selecting the Acceptance Option "Yes" at 415, the user device 405 may display a second user interface 425, as shown in FIG. 4B. The second user interface 425 may allow the user to select specific data to scramble. The user may enter their name, address, phone number, age, social security number, e-mail, username, social media handle, bank account number, credit card number, tax ID number, date of birth and/or the like, for example, using fields 430. Further, user may up load a video, audio file, or image to obfuscate, via field 435. After the user has selected the data to obfuscate, user device 405 may send the data to the computing device. As discussed above, the computing device may verify the data by comparing the received data with data stored in a database. If the received data does not match the stored data, another interface (not shown) may display an option for the user to confirm which information is valid or correct.

After confirming the data is accurate, the computing device may generate synthetic user personal data using the techniques described above. FIG. 4C shows an example of a third user interface 440. The computing device may cause third user interface 440 to be displayed in order to request the user's approval to use (e.g., publish, disseminate) the generated synthetic personal data. Third user interface 440 may present the generated synthetic personal data 445, an approval option 450, a rejection option 455, and a cancel button 460. If the user rejects generated synthetic personal data, the user device 405 may send an indication of the rejection to the computing device. The computing device may then generate new synthetic personal data for user approval. The process may repeat until the user accepts the generated synthetic personal data or cancels the process. If the user approves the use of the generated synthetic personal data 445, the user device 405 may send a response to the computing device indicating that the user has accepted the generated synthetic personal data. The computing device may then proceed to disseminate the generated synthetic personal data as described above.

Figure 4D:
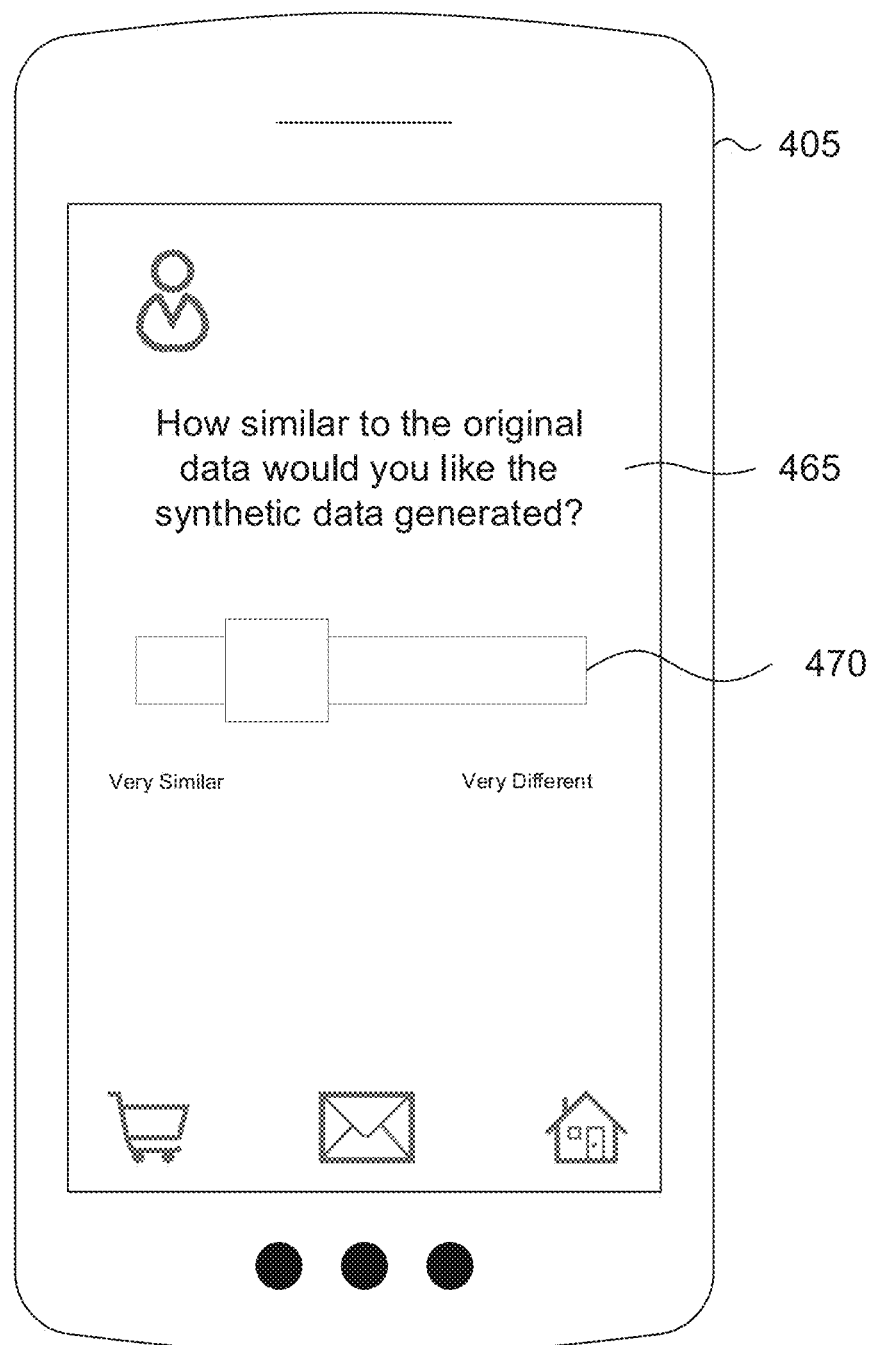

FIG. 4D illustrates a fourth user interface 465. The fourth user interface 465 may allow the user to define the similarity threshold. As shown in FIG. 4D, the fourth user interface may display a sliding scale 470 to allow the user to define the similarity value. While a sliding scale is shown in FIG. 4D, it will be appreciated that other displays and/or mechanisms may be used to define the similarity value.

Aspects described herein may obfuscate or scramble a user's true data by disseminating and/or publishing synthetic personal data. The synthetic personal data may provide greater privacy and control of user's personal information. The enhanced ability to control and protect one's own personal information online may lead to increased trust in participating with online activities, further confidence in protecting and promoting one's own reputation, and greater personal security.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
receiving, by a server from a user device associated with a user, a request to obfuscate publicly available personal data associated with the user;
retrieving, by the server from a database associated with the server, verified personal data associated with the user, wherein the verified personal data comprises personal information vetted by one or more government entities;
training, by the server using a training dataset, a machine learning model to generate synthetic personal data, wherein the training dataset comprises at least one of: a commercial training dataset, a previously constructed training dataset, or verified personal data associated with the user;
generating, by the server using the trained machine learning model and based on the verified personal data, synthetic personal data associated with the user; and
disseminating, by the server and based on receiving approval to disseminate the synthetic personal data from the user device, the synthetic personal data on the Internet.

2. The method of claim 1, further comprising:
before disseminating the synthetic personal data, calculating, by the server, a difference value between the synthetic personal data and the verified personal data, wherein disseminating the synthetic personal data on the Internet is based on a determination that the difference value satisfies a threshold.

3. The method of claim 2, further comprising:
calculating, by the server, a similarity value between the synthetic personal data and the verified personal data, wherein disseminating the synthetic personal data on the Internet is further based on a determination that the similarity value satisfies a second threshold.

4. The method of claim 1, wherein disseminating the synthetic personal data comprises:
creating, by the server, a dummy social media account associated with the user;
publishing, by the server, the dummy social media account to the Internet; and
uploading, by the server, the synthetic personal data to the published dummy social media account.

5. The method of claim 1, further comprises:
disseminating, by the server, synthetic personal data to a Tor network.

6. The method of claim 1, wherein the synthetic personal data comprises at least one of:
a name;
a phone number;
an address;
an e-mail;
an image;
a video;
an audio file;
a username;
a social media handle;
a bank account number;
a credit card number;
a social security number; or
a date of birth.

7. The method of claim 1, wherein the disseminating the synthetic personal data on the Internet comprises at least one of:
posting the synthetic personal data to a social media website;
publishing an article containing the synthetic personal data to a news website; or
publishing a blog post that comprises the synthetic personal data.

8. The method of claim 1, wherein the machine learning model comprises at least one of:
a supervised machine learning model;

an unsupervised machine learning model; or
a semi-supervised machine learning model.

9. The method of claim 1, wherein the machine learning model comprises at least one of:
a generative adversarial network (GAN); or
a conditional generative adversarial network (cGAN).

10. A computing device, comprising:
one or more processors; and
memory storing instructions that, when executed by the one or more processors, cause the computing device to:
receive, from a user device associated with a user, a request to obfuscate publicly available personal data associated with the user;
monitor one or more public sites for publicly available personal data associated with the user;
generate, using a trained machine learning model and based on a comparison of the publicly available personal data to verified personal data associated with the user, synthetic personal data associated with the user, wherein the synthetic personal data comprises data configured to appear similar to verified personal data associated with the user while being different from verified personal data associated with the user; and
disseminate, based on locating publicly available personal data associated with the user and based on receiving approval to disseminate the synthetic personal data from the user device, the synthetic personal data to one or more public sites.

11. The computing device of claim 10, wherein the instructions, when executed by the one or more processors, cause the computing device to:
calculate, before disseminating the synthetic personal data to a public site, a difference value between the synthetic personal data and the verified personal data, wherein disseminating the synthetic personal data to a public site is based on a determination that the difference value between the synthetic personal data and the verified personal data satisfies a threshold.

12. The computing device of claim 10, wherein the one or more public sites comprise at least one of:
a social media website;
a news website;
a blog post;
a Tor network;
an intranet;
a social media account; or
a software app.

13. The computing device of claim 10, wherein the synthetic personal data comprises at least one of:
a name;
a phone number;
an address;
an e-mail;
an image;
a video;
an audio file;
a username;
a social media handle;
a bank account number;
a credit card number;
a social security number; or
a date of birth.

14. The computing device of claim 10, wherein the instructions, when executed by the one or more processors, cause the computing device to:
locate publicly available personal data associated with the user on a user's social media account;
remove one or more entries from one or more of the user's social media accounts; and
publish synthetic personal data to the one or more of the user's social media accounts.

15. The computing device of claim 10, wherein the machine learning model comprises at least one of:
a supervised machine learning model;
an unsupervised machine learning model; or
a semi-supervised machine learning model.

16. The computing device of claim 10, wherein the machine learning model comprises at least one of:
a generative adversarial network (GAN); or
a conditional generative adversarial network (cGAN).

17. A non-transitory computer readable medium storing instruction that, when executed by one or more processors, cause a computing device to perform steps comprising:
receiving, from a user device associated with a user, a request to obfuscate publicly available personal data associated with the user;
monitoring one or more public sites for publicly available personal data associated with the user;
generating, using a trained machine learning model and based on a comparison of the publicly available personal data to verified personal data associated with the user, synthetic personal data associated with the user of the user device, wherein the synthetic personal data is configured to appear similar to verified personal data associated with the user, while being different; and
disseminating, based on locating publicly available personal data associated with the user in a public sites and based on receiving approval to disseminate the synthetic personal data from the user device, the synthetic personal data to the public sites.

18. The non-transitory computer readable medium of claim 17, wherein the instruction, when executed by the one or more processors, cause the computing device to perform steps comprising:
calculating, before disseminating the synthetic personal data to a public sites, a difference value between the synthetic personal data and the verified personal data, wherein disseminating the synthetic personal data to a public sites is based on a determination that the difference value between the synthetic personal data and the verified personal data satisfies a threshold.

19. The non-transitory computer readable medium of claim 17, wherein the synthetic personal data comprises at least one of:
a name;
a phone number;
an address;
an e-mail;
an image;
a video;
an audio file;
a username;
a social media handle;
a bank account number;
a credit card number;
a social security number; or
a date of birth.

20. The non-transitory computer readable medium of claim 17, wherein the public sites comprise at least one of:
a social media website;
a news website;
a blog post;

a Tor network;
an intranet;
a social media account; or
a software app.

* * * * *